United States Patent
Suzuki et al.

(10) Patent No.: US 6,330,453 B1
(45) Date of Patent: Dec. 11, 2001

(54) MAP INFORMATION PROVIDING METHOD AND SYSTEM AND TERMINAL DEVICE USED THEREIN

(75) Inventors: Akihiro Suzuki, Neyagawa; Nobuyuki Nakano, Katano; Hisaya Fukuda, Sakai, all of (JP)

(73) Assignee: Matsushitas Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/244,032

(22) Filed: Feb. 4, 1999

(30) Foreign Application Priority Data

Feb. 6, 1998 (JP) .................................................. 10-026245

(51) Int. Cl.⁷ ...................................................... H04Q 7/20
(52) U.S. Cl. ............................................ 455/456; 455/457
(58) Field of Search ..................................... 455/456, 457, 455/455, 417, 521, 557; 342/357.01, 357.09; 340/995, 988, 990, 901; 701/208, 209, 211, 212, 200

(56) References Cited

U.S. PATENT DOCUMENTS

| | | | | |
|---|---|---|---|---|
| 4,819,174 | * | 4/1989 | Furuno et al. | 701/211 |
| 4,873,513 | * | 10/1989 | Soults et al. | 345/27 |
| 5,465,088 | * | 11/1995 | Braegas | 340/905 |
| 5,761,618 | * | 6/1998 | Lynch et al. | 455/419 |
| 5,802,492 | * | 9/1998 | DeLorme et al. | 455/456 |
| 6,061,003 | * | 5/2000 | Harada | 340/995 |
| 6,091,956 | * | 6/2000 | Hollenberg | 455/456 |
| 6,124,826 | * | 9/2000 | Garthwaite et al. | 342/357.09 |

FOREIGN PATENT DOCUMENTS

| | | |
|---|---|---|
| 0 642 108 | 8/1994 | (EP) . |
| 0 785 535 | 7/1997 | (EP) . |
| 0 786 646 | 7/1997 | (EP) . |
| 2 195 868 | 4/1988 | (GB) . |
| 8-22246 | 1/1996 | (JP) . |
| 9-270720 | 10/1997 | (JP) . |
| 93/18495 | 9/1993 | (WO) . |

* cited by examiner

Primary Examiner—Nay Maung
Assistant Examiner—Jean A Gelin
(74) Attorney, Agent, or Firm—Wenderoth, Lind & Ponack, L.L.P.

(57) ABSTRACT

A base station transmits map information in which a predetermined area is divided in rectangular areas and represented on several steps of scales by using a broadcast channel. The user of a terminal device enters scale and area of map information currently required. The terminal device stores only the map information of the area and scale that the user requires among a plurality of pieces of map information transmitted on the broadcast channel in an internal map storage portion. Thus a map information providing method and a terminal device used in the method are provided, wherein the terminal device can select required information from among the map information transmitted from the base station.

41 Claims, 8 Drawing Sheets

MAP INFORMATION PROVIDING METHOD AND SYSTEM AND TERMINAL DEVICE USED THEREIN

BACKGROUND OF THE INVENTION

1. Field of the Invention

The present invention relates to map information providing methods and a terminal device used in the methods, and more particularly to a map information providing method in which a base station provides a plurality of kinds of map information through a broadcast channel to a terminal device which can move freely in the service area and to the terminal device used in the method.

2. Description of the Background Art

Conventionally, for example, Japanese Patent Laying-Open No.8-22246 discloses a map information providing system in which a base station and terminal devices are communicably connected so that the terminal devices can receive and display map information transmitted from the base station. More specifically, the base station transmits predetermined map information to terminal devices. The terminal devices receive and display the map information so that the users can utilize the map information.

In this case, the users do not always utilize all map information transmitted from the base station, so they will want to store only necessary map information in storage devices. However, conventional map information providing systems do not allow the terminal devices to select required information out of the map information transmitted. Therefore they must store the map information including unnecessary information in the storage devices. This requires that the terminal devices be equipped with storage devices having larger capacity than required.

Further, the map information is frequently updated because of constructions of new roads and buildings, for example. However, the conventional terminal devices are incapable of managing versions of the map information, and they repeatedly receive map information of the same version and store the information in storage devices, which also leads to an increase in capacity of the storage devices.

SUMMARY OF THE INVENTION

Accordingly, an object of the present invention is to provide a map information providing method in which a terminal device can select required information from among map information transmitted from a base station and the terminal device used in this method. The object of the present invention is achieved by the following characteristic aspects having the peculiar effects below.

A first aspect of the present invention is directed to a method in which a base station provides a plurality of kinds of map information through a broadcast channel to a terminal device mobile in a service area. In the map information providing method, the base station comprises an adding step of adding index information about areas and scales of individual pieces of map information respectively to the individual pieces of map information, and a transmitting step of transmitting the map information accompanied by the index information by using the channel, and the terminal device comprises a receiving step of receiving the map information transmitted on the channel, a map specifying step of specifying an area and a scale of a required piece of map information on the basis of an external input, and a first storage step of storing the map information corresponding to the specified area and scale among the map information received.

According to the first aspect, the base station transmits a plurality of kinds of map information together with the index information. The terminal device selects required information out of the map information received by utilizing the index information. Accordingly the terminal device does not store unnecessary map information. This allows the terminal device to use a storage device with smaller capacity than conventional ones.

According to a second aspect, in the first aspect, the base station further adds version information of the map information as the index information in the adding step, and the terminal device further comprises a second storage step of storing the newest map information among the received map information on the basis of the version information.

According to the second aspect, the terminal device can store only the newest map information transmitted from the base station. This allows the terminal device to use a storage device with smaller capacity than conventional ones.

According to a third aspect, in the first aspect, the base station further transmits traffic information and/or area information about the service area in the transmitting step, and the terminal device further comprises an information specifying step of specifying required traffic information and/or area information on the basis of an external input. The terminal device further receives the traffic information and/or the area information transmitted on the channel in the receiving step, and stores the specified traffic information and/or area information among the received traffic information and/or area information in the first storage step.

According to the third aspect, the terminal device can be used more conveniently because it can utilize traffic information and area information, too.

According to a fourth aspect, in the first aspect, a plurality of base stations are provided in the service area, and the service area is covered by cells respectively defining areas in which the base stations can transmit the map information, and the map information in the vicinity of a boundary between adjacent cells is transmitted from the individual base stations forming the cells.

According to the fourth aspect, the terminal device can smoothly acquire the map information even when moving over a plurality of cells, since the map information in the vicinity of boundaries between cells is transmitted from a plurality of base stations.

According to a fifth aspect, in the fourth aspect, in the transmitting step, the plurality of base stations periodically transmit the map information accompanied by the index information by using the different channels and also transmit identification signals so that the terminal device can identify the channels respectively assigned to the base stations, and the terminal device further comprises a search/identify step of automatically searching and identifying the channels respectively assigned to the base stations on the basis of the identification signals transmitted from the individual base stations.

According to the fifth aspect, the terminal device can search and identify channels of the base stations respectively on the basis of the identification signals, so that it can smoothly acquire the map information even when moving beyond a plurality of cells.

According to a sixth aspect, in the first aspect, the base station transmits newest road network data corresponding to the areas and scales of the map information in the transmitting step, thereby allowing the terminal device to execute a route search in accordance with an arbitrary distance.

According to the sixth aspect, when the terminal device has a route search function, it can perform the route search by using the newest road network data for each area and scale specified by the map specifying portion, and it can thus appropriately perform the route search in accordance with an arbitrary distance.

A seventh aspect of the present invention is directed to a terminal device constructed to be mobile in a service area and utilizing predetermined map information among a plurality of kinds of map information transmitted on a broadcast channel from a base station. The base station transmits the plurality of kinds of map information and index information about areas and scales of individual pieces of the map information by using the channel, and the terminal device comprises a map specifying portion for specifying an area and a scale of required map information on the basis of an external input, a receiving portion for receiving the map information transmitted on the channel, a discriminating portion for discriminating (to discriminate means to pick out the information a user specified from among pieces of transmitted information) the map information corresponding to the area and scale specified by the map specifying portion among the map information received at the receiving portion, and a storage portion for storing the map information discriminated by the discriminating portion.

According to the seventh aspect, the terminal device receives a plurality of kinds of map information provided with index information and selects/rejects the received map information on the basis of the index information. Accordingly the terminal device does not store unwanted map information. Then the terminal device can use a storage device with smaller capacity than conventional ones.

According to an eighth aspect, in the seventh aspect, the terminal device further comprises a display portion for displaying the map information discriminated by the discriminating portion or the map information stored in the storage portion.

According to the eighth aspect, the display portion displays the map information and the terminal device can therefore be used more conveniently.

According to a ninth aspect, in the seventh aspect, the terminal device further comprises a current position obtaining portion for obtaining its own current position, and the discriminating portion discriminates map information including the current position obtained by the current position obtaining portion among the map information received at the receiving portion.

According to the ninth aspect, the terminal device stores map information including the current position that the current position obtaining portion obtained. That is to say, the terminal device selects/rejects received map information on the basis of the current position obtained by the current position obtaining portion. This allows the terminal device to use a storage device with smaller capacity than conventional ones.

According to a tenth aspect, in the ninth aspect, the terminal device further comprises a display portion for displaying the map information discriminated by the discriminating portion or the map information stored in the storage portion and the current position obtained by the current position obtaining portion.

According to the tenth aspect, the terminal device can be conveniently used since the display portion displays the current position.

According to an eleventh aspect, in the seventh aspect, the terminal device further comprises a destination specifying portion for specifying a destination on the basis of an external input, and a route searching portion for searching for a route to the destination specified by the destination specifying portion by referring to the map information previously stored in the storage portion, and the discriminating portion further discriminates the map information including the route found by the route searching portion.

According to the eleventh aspect, the terminal device stores only the map information including the route found by the route searching portion and represented on the currently required scale among the plurality of kinds of map information transmitted from the base station. Accordingly the terminal device can use a storage device with smaller capacity than conventional ones.

According to a twelfth aspect, in the eleventh aspect, the terminal device further comprises a display portion for displaying the map information discriminated by the discriminating portion and including the route found by the route searching portion.

According to the twelfth aspect, the display portion displays map information including the route found by the route searching portion and therefor the terminal device can be used more conveniently.

According to a thirteenth aspect, in the eleventh aspect, the terminal device further comprises a current position obtaining portion for obtaining its own current position, and the route searching portion searches for a route to the destination from the current position obtained by the current position obtaining portion and the discriminating portion discriminates the map information including the route from the current position to the destination found by the route searching portion.

According to the thirteenth aspect, the terminal device stores map information including the route from the current position to a destination among a plurality of kinds of map information transmitted from the base station. Accordingly the terminal device can use a storage device with smaller capacity than conventional ones.

According to a fourteenth aspect, in the thirteenth aspect, the terminal device further comprises a display portion for displaying the map information discriminated by the discriminating portion and including the route found by the route searching portion.

According to the fourteenth aspect, the display portion displays map information including the route found by the route searching portion, and the terminal device can therefore be used more conveniently.

According to a fifteenth aspect, in the seventh aspect, the base station transmits traffic information and/or area information about the service area and the terminal device further comprises an information specifying portion for specifying required traffic information and/or area information on the basis of an external input. The receiving portion receives the traffic information and/or area information transmitted on the channel and the discriminating portion discriminates the traffic information and/or area information specified by the information specifying portion among the traffic information and/or area information received at the receiving portion.

According to the fifteenth aspect, the terminal device can be used more conveniently since it can utilize the traffic information and area information.

According to a sixteenth aspect, in the fifteenth aspect, the terminal device further comprises a display portion for displaying the traffic information and/or area information discriminated by the discriminating portion alone or together with the map information discriminated by the discriminating portion.

According to the sixteenth aspect, the display portion at least displays the traffic information and/or area information, and therefore the user can easily utilize the traffic information and/or area information and the terminal device can thus be used more conveniently.

According to a seventeenth aspect, in the sixteenth aspect, the traffic information and/or area information includes a telephone number, and the terminal device further comprises a telephone line connecting portion for making a call to the telephone number included in the traffic information and/or area information displayed on the display portion.

According to the seventeenth aspect, the telephone line connecting portion gives a call to the telephone number included in the traffic information and/or area information. Then the user can easily utilize the traffic information and/or area information and the terminal device can thus be used more conveniently.

According to an eighteenth aspect, in the seventeenth aspect, an information storage portion containing detailed information related to the traffic information and/or area information is connected to the telephone line, and the telephone line connecting portion obtains the detailed information related to the traffic information and/or area information stored in the information storage portion through the telephone line.

According to the eighteenth aspect, the telephone line connecting portion obtains detailed information related to the traffic information and/or area information stored in the information storage portion through the telephone line. Thus the user can easily utilize the traffic information and/or area information and the terminal device can be used more conveniently.

According to a nineteenth aspect, in the seventeenth aspect, the traffic information and/or area information includes URL (Uniform Resource Locator), and a WWW (World Wide Web) server containing detailed information related to the traffic information and/or area information is connected to the telephone line through Internet. The telephone line connecting portion connects to the WWW server through the telephone line and the Internet to obtain the detailed information related to the traffic information and/or area information specified by the URL.

According to the nineteenth aspect, the telephone line connecting portion can obtain the detailed information related to the traffic information and/or area information stored in the WWW server through the telephone line and Internet. Then the user can use the terminal device more conveniently by easily utilizing the traffic information and/or or area information.

According to a twentieth aspect, in the seventh aspect, the base station also periodically transmits, by using the channel, version information about the map information to be transmitted and the discriminating portion discriminates the newest map information among the map information received at the receiving portion on the basis of the version information.

According to the twentieth aspect, the terminal device stores only the newest map information transmitted from the base station. Then the terminal device can use a storage device with smaller capacity than conventional ones.

According to a twenty-first aspect, in the twentieth aspect, the map information includes road network data, and the discriminating portion discriminates the newest road network data on the basis of the version information.

According to the twenty-first aspect, the terminal device can utilize the newest road network data and it can thus be used further conveniently.

According to a twenty-second aspect, in the twenty-first aspect, the terminal device further comprises a destination specifying portion for specifying a destination on the basis of an external input, and a route searching portion for searching for a route to the destination specified by the destination specifying portion by referring to the road network data previously stored in the storage portion. When the discriminating portion discriminates the newest road network data, the route searching portion searches for the route to the destination on the basis of the newest road network data.

According to the twenty-second aspect, the route searching portion searches for the route to a destination on the basis of the newest road network data so as to correctly guide the user to the destination, and the terminal device can thus be used further conveniently.

According to a twenty-third aspect, in the twentieth aspect, the map information includes link cost, and the discriminating portion further discriminates the newest link cost on the basis of the version information.

According to the twenty-third aspect, the terminal device can utilize the newest link cost and it can be used still more conveniently.

According to a twenty-fourth aspect, in the twenty-third aspect, the terminal device further comprises a destination specifying portion for specifying a destination on the basis of an external input, and a route searching portion for searching for a route to the destination specified by the destination specifying portion by referring to the link cost previously stored in the storage portion. When the discriminating portion discriminates the newest link cost, the route searching portion searches for the route to the destination on the basis of the newest link cost.

According to the twenty-fourth aspect, the route searching portion searches for the route to a destination on the basis of the newest link cost so that it can correctly guide the user to the destination, and the terminal device can thus be used more conveniently.

According to a twenty-fifth aspect, in the seventh aspect, a plurality of base stations are provided and the service area in which the map information can be provided is covered by a plurality of cells respectively defining areas in which the base stations can transmit the map information. The base stations transmit the map information and the index information by using different channels and also transmit identification signals for identification of the channels, and the terminal device further comprises a channel identifying portion for automatically searching and identifying the channels used by the base stations on the basis of the identification signals received.

According to the twenty-fifth aspect, the terminal device can obtain the map information by using channels automatically searched and identified by the channel identifying portion, and it can thus smoothly receive the map information even while moving over a plurality of cells.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
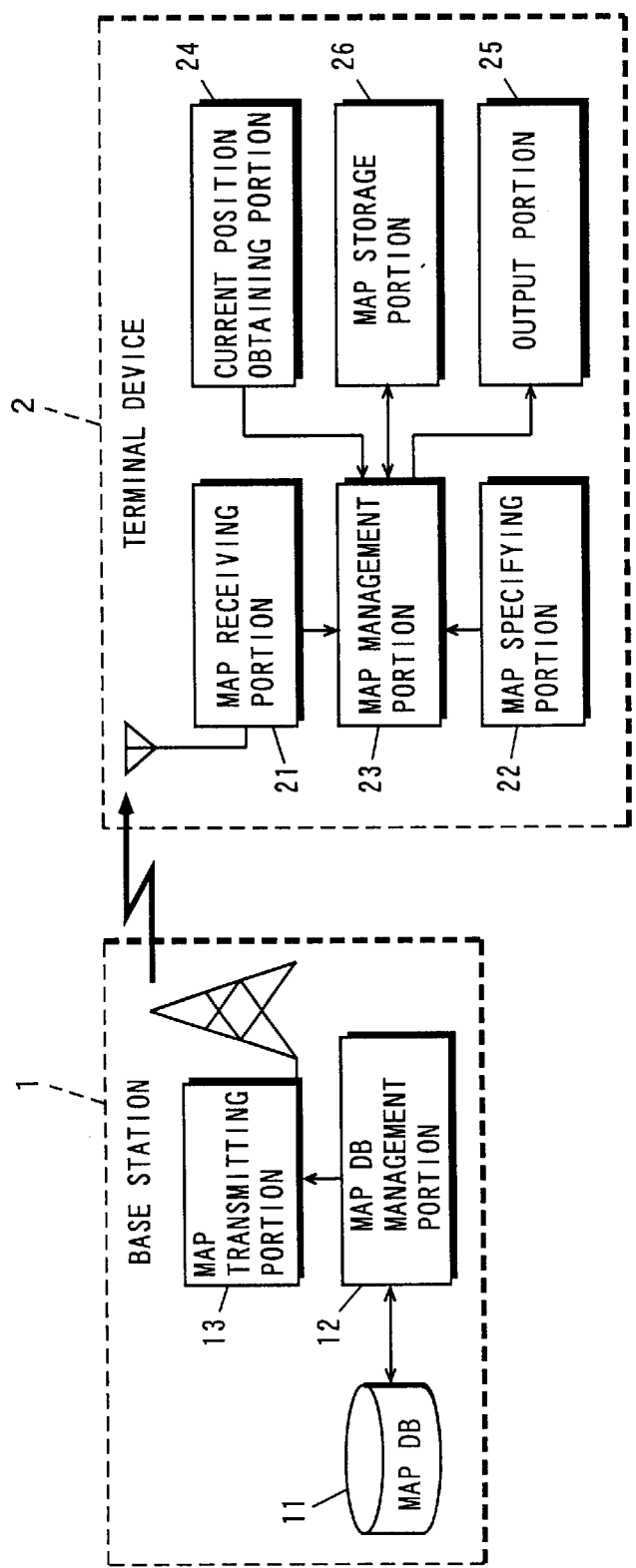
FIG. 1 is a diagram showing the structure of a system to which a map information providing method of an embodiment of the present invention is applied.

FIG. 1 is a diagram showing the structure of a system to which a map information providing method of an embodiment of the present invention is applied. In FIG. 1, this system includes a base station 1 and a terminal device 2. The base station 1 provides map information in broadcast form to the terminal device 2 which is mobile in the service area. The base station 1 has a map database (hereinafter referred to as a map DB) 11, a map DB management portion 12, and a map transmitting portion 13.

The map DB 11 is a database for map information, which is managed by the map DB management portion 12. The map information is composed of part of or a combination of map data, road network data, additional information, etc. The map data are used for display in the terminal device 2. The road network data are used to detect the current position of the terminal device 2 (typically, a vehicle) or used for route search in the route searching portion 72 described later. Since these data are used in conventional car navigation systems, they are not specifically described herein.

Figure 2:
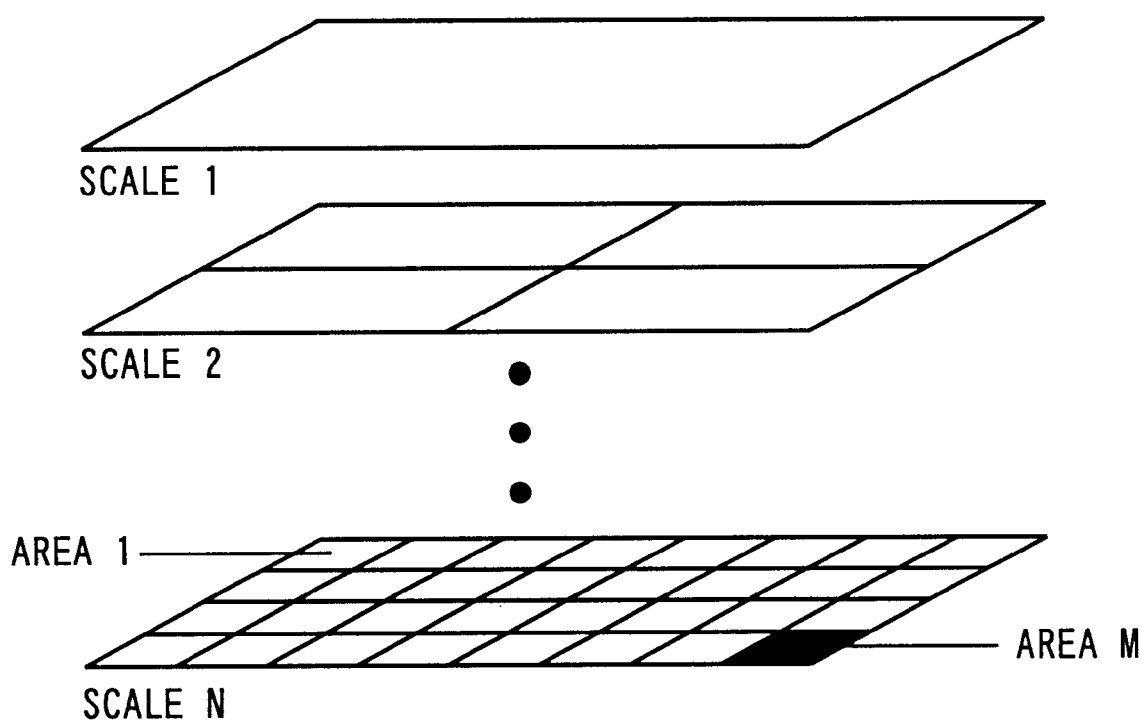
FIG. 2 is a diagram showing an example of structure of the map information stored in the map DB 11 shown in FIG. 1.

FIG. 2 is a diagram showing an example of structure of the map information stored in the map DB 11. Stored in the map DB 11 are multiple pieces of map information which represent a predetermined area on N levels of scales 1 to N. Specifically, a predetermined area is divided into four rectangular areas on the scale 2, and is divided into M rectangular areas 1 to M on the scale N, and then the divided areas are stored. The individual rectangular areas are provided with area numbers, which allow the terminal device 2 to identify the areas shown by the map information. In this embodiment, one rectangular area represents the smallest area at the scale N, which shows the corresponding area in greater detail than those at other scales. In this embodiment, a predetermined area is divided into rectangular areas merely by way of example, and a predetermined area can be divided into arbitrary shape. The map DB 11 thus contains multiple kinds of map information.

The map DB management portion 12 manages the storage locations of individual pieces of map information in the map DB 11. The map DB management portion 12 reads and outputs the map information to the map transmitting portion 13 according to a program previously stored therein (not shown). The map transmitting portion 13 transmits the map information provided from the map DB management portion 12 through an antenna. The map information is thus provided in broadcast form to the individual terminal devices 2 moving freely in the service area.

This embodiment uses frequency division multiplex technique or time division multiplex technique to transmit the plurality of kinds of map information. When the frequency division multiplex technique is used, the map transmitting portion 13 uses carriers having different frequencies as a plurality of broadcast channels. Different reduction scales and areas are previously assigned to the individual channels. The map transmitting portion 13 periodically transmits the map information by using the plurality of broadcast channels. The terminal device 2 can thus obtain map information, which is required by its user, through a particular broadcast channel. When the frequency division multiplex technique cannot be applied to the map transmitting portion 13, the time division multiplex technique is applied to it. In the time division multiplex technique, a plurality of time slots is used as the plurality of broadcast channels. The time slots are those obtained by dividing a carrier having a predetermined frequency in predetermined time intervals.

Figure 3:
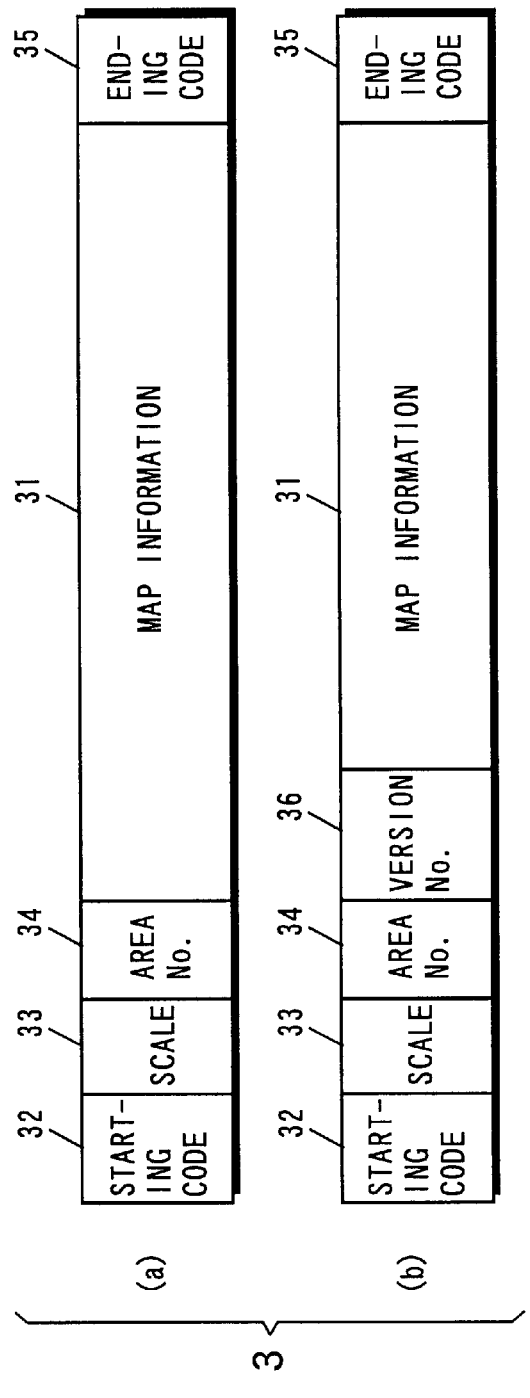
FIGS. 3(a) and (b) are diagrams showing map information 31 transmitted from the base station 1 shown in FIG. 1 and index information attached thereto.

A plurality of kinds of map information is transmitted in this embodiment. Therefore, index information composed of a starting code 32, a scale 33, an area number 34, and an ending code 35, is added to the each map information 31, as shown in FIG. 3(a), so that the terminal device 2 can discriminate required map information. The starting code 32 and the ending code 35 allow correct separation of the scale 33, area number 34, and map information 31. The terminal device 2 analyzes the scale 33 and the area number 34 to determine whether the map information 31 having them is the information of scale and area specified by the user.

As shown in FIG. 3(b), a version number 36 may be added to the map information 31. The version number 36 is typically based on the time when the map information 31 was created. The terminal device 2 executes version management as described later on the basis of the version numbers 36.

As shown in FIG. 1, the terminal device 2 has a map receiving portion 21, a map specifying portion 22, a map management portion (which corresponds to the discriminating portion in claims) 23, a current position obtaining portion 24, an output portion (which corresponds to the display portion in claims) 25, and a map storage portion 26. The map receiving portion 21 receives the map information 31 and its index information transmitted from the base station 1 through an antenna. The map specifying portion 22 includes input equipment such as a remote controller, keyboard, etc. The user of this terminal device 2 operates the input equipment to enter scale and area of the currently required map information 31. The map specifying portion 22 specifies the scale and area of the currently required map information 31 according to the input by the user. The map management portion 23 discriminates the map information 31 of the scale and area specified by the map specifying portion 22 and its index information from among the pieces of map information 31 and their index information received at the map receiving portion 21. Then the map management portion 23 stores the discriminated information in the map storage portion 26. The current position obtaining portion 24 obtains the current position of the terminal device 2. The output portion 25 includes a display, a speaker, etc. for displaying the map information 31 required by the user, or for providing the information by speech guide. The map information 31 which was demanded by the user in the past and the corresponding index information are stored in the map storage portion 26.

Operations of the individual parts of this system constructed as described above will now be described. In the description about operation below, operation of the base station 1 is described referring to the flowchart in FIG. 4 and operation of the terminal device 2 is described referring to the flowchart in FIG. 5.

Figure 4:
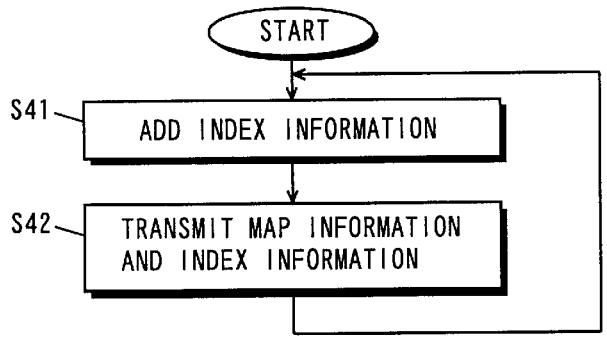
FIG. 4 is a flowchart showing operation of the base station shown in FIG. 1.

The base station 1 adds necessary index information (the starting code 32, scale 33, area number 34, and ending code 35 (see FIG. 3(a)) to the individual pieces of map information 31 (step S41 in FIG. 4). The base station 1 transmits the map information 31 and index information by using the above-described channels (step S42).

The map receiving portion 21 of the terminal device 2 receives the map information 31 and the index information transmitted from the broadcast channels at the antenna (step S51 in FIG. 5) and temporarily holds the information. The current position obtaining portion 24 obtains the current position of the mobile terminal device 2. After the step S51, the map management portion 23 receives the current position of the terminal device 2 from the current position obtaining portion 24 (step S52). Then the map management portion 23 checks whether the map information 31 temporarily held in the map receiving portion 21 includes map information 31 containing the current position of the terminal device 2 (step S53). The step S53 is now described more specifically. The current position obtaining portion 24 is typically composed of a GPS (Global Positioning System) receiver. The current position of the terminal device 2 obtained by the GPS receiver is typically represented in latitude and longitude. The map management portion 23 previously contains a table describing the correspondence between the area numbers and the latitudes and longitudes of the areas represented by the area numbers. The map management portion 23 refers to this table to find the area number corresponding to the current position of the terminal device 2. The map management portion 23 then compares the area number found and the area number 34 added to the map information 31 temporarily held in the map receiving portion 21 to discriminate the map information 31 containing the current position of the terminal device 2. For another method of making the discrimination in step S53, instead of using such a table in the map management portion 23, the base station 1 may allow information about latitudes and longitudes of the areas to be included in the corresponding area numbers 34 added to the map information 31.

When the map receiving portion 21 does not hold the map information 31 containing the current position of the terminal device 2, the map management portion 23 returns to step S51 to execute the process of receiving the periodically transmitted map information again. When the map receiving portion 21 holds the map information 31 containing the current position of the terminal device 2, the map management portion 23 proceeds to step S54. At the time the step 54 is executed, the user of the terminal device 2 has already entered the scale and area of required map information by using the above-described input equipment, and the map specifying portion 22 has indicated the input scale and area to the map management portion 23. The map management portion 23 analyzes the scale 33 and area number 34 of the map information 31 currently held in the map receiving portion 21 to see whether it holds the map information 31 of the scale and area the user requires (step S54). When the map receiving portion 21 does not hold the map information 31 corresponding to the scale and area the user wants, the map management portion 23 returns to step 351 to re-execute the process of receiving the periodically transmitted map information. When the map receiving portion 21 holds the required map information 31, the map management portion 23 takes out that map information 31 and its index information. In step S54, the user is not necessarily required to enter the scale and area of the map information 31. The scale and area of the map information 31 may be previously set in the terminal device 2 so that the map management portion 23 can take out the map information 31 corresponding to the previously set scale and area.

As has been stated above, the map storage portion 26 contains map information 31 that the terminal device 2 obtained in the past from the base station 1 and the index information thereof. Immediately after step S54, the map management portion 23 analyzes the scales 33 and the area numbers 34 of the map information 31 already stored in the map storage portion 26 to see whether it contains the map information 31 of the scale and area the user wants (step S55). When the required map information 31 is stored in the map storage portion 26, the map management portion 23 takes out the corresponding map information 31 and outputs it from the output portion 25 by displaying it on the monitor, for example. Then the user can utilize the required map information 31. Subsequently, the terminal device 2 returns to step S51 to re-execute the process of receiving the map information 31. When the map information 31 the user wants is not stored in the map storage portion 26, the map management portion 23 stores the map information 31 and its index information taken out from the map receiving portion 21 immediately after step S52 (step S56) and outputs it from the output portion 25.

As has been described above, according to this system, the map storage portion 26 selects and stores map information 31 that the user requires from among a plurality of kinds of map information received. Then a storage device having smaller capacity than conventional ones can be used in the map storage portion 26.

Figure 5:
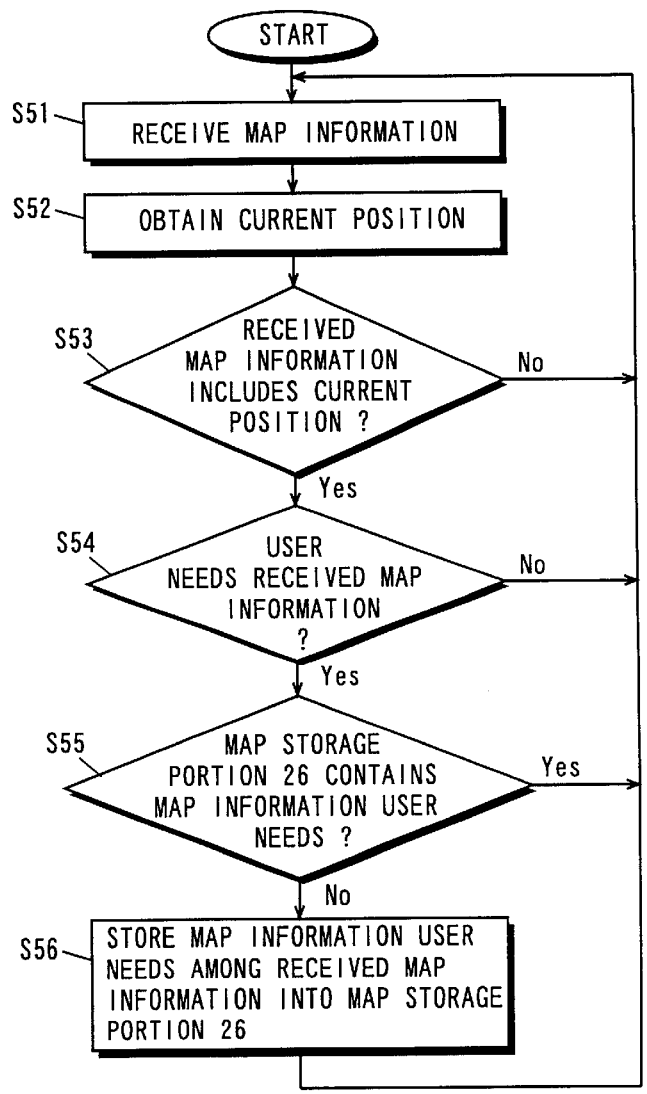
FIG. 5 is a flowchart showing operation of the terminal device 2 shown in FIG. 1.
Figure 6:
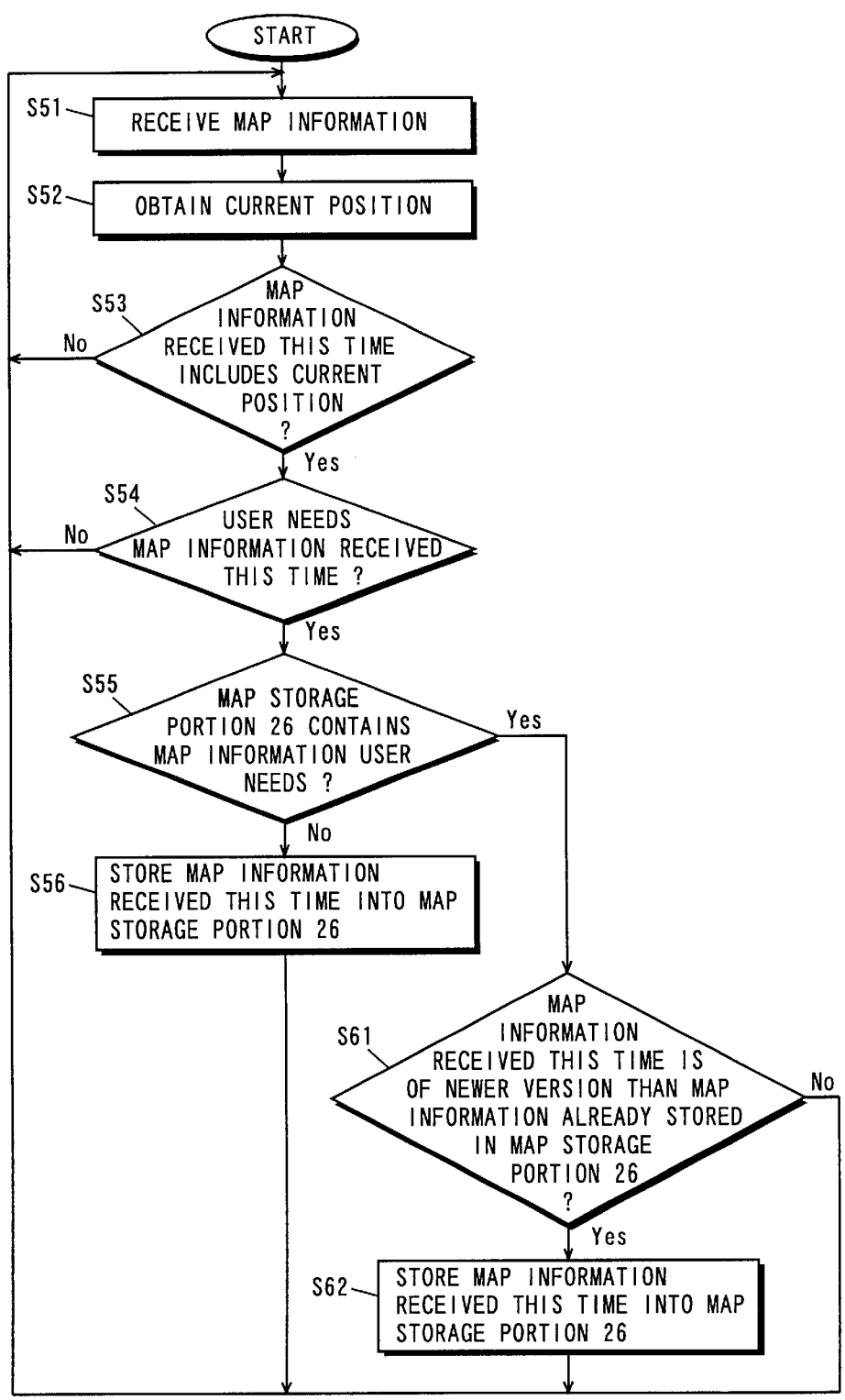
FIG. 6 is a flowchart showing another operation of the terminal device 2 shown in FIG. 1.

When the base station 1 further adds the version number 36 to the map information 31 as the index information, the terminal device 2 executes the operation as shown in the flowchart in FIG. 6. In FIG. 6, the steps corresponding to those already described referring to FIG. 5 are shown by the same step numbers and not described again.

When the map management portion 23 in the terminal device 2 determines that the map information 31 required by the user is stored in the map storage portion 26 in step S55, it proceeds to step S61. In this step S61, the map management portion 23 compares the version numbers 36 added to the information held in the map receiving portion 21 and the information already stored in the map storage portion 26 to see whether the map information 31 in the map receiving portion 21 is of a newer version than the map information 31 in the map storage portion 26 (step S61). When the result of this determination shows that the map information 31 in the map receiving portion 21 is of a newer version, the map management portion 23 takes out the newer version map information 31 and its index information from the map receiving portion 21 and stores them in the map storage portion 26 (step S62). Preferably, the map information 31 of older version and its index information are deleted after this step S62, so as to efficiently utilize the capacity of the map storage portion 26.

As has been described above, according to this system, the map storage portion 26 stores map information 31 of newer versions only. Accordingly, a storage device with a smaller storage capacity than conventional ones can be used in the map storage portion 26.

The above-described embodiment has explained a system containing a single base station 1. Practically, however, such a system for providing map information must cover a vast area. Therefore, the so-called cell system is applied to it.

Figure 7:
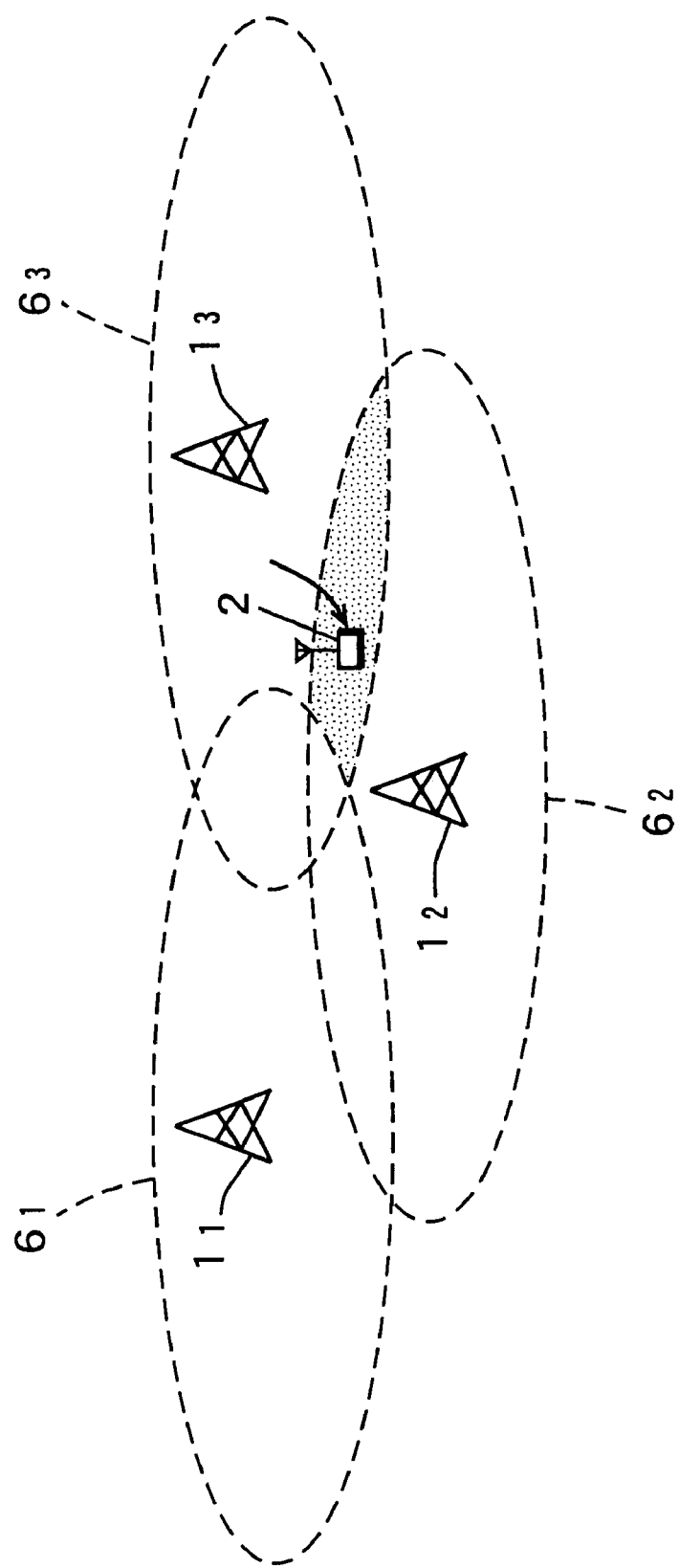
FIG. 7 is a diagram used to explain a system applying the cell system and accommodating a plurality of base stations 1.

FIG. 7 is a diagram used to explain a system adopting the cell system and containing a plurality of base stations 1. For simplification, it is assumed here that the system in FIG. 7 includes three base stations $1_1$ to $1_3$. The base stations $1_1$ to $1_3$ have their respective cover areas (hereinafter referred to as cells) $6_1$ to $6_3$. The sizes of the cells $6_1$ to $6_3$ are defined on the basis of the area in which radio waves (map information) transmitted from the base stations $1_1$ to $1_3$ can reach. Basically, the base stations $1_1$ to $1_3$ transmit the map information 31 in which the areas corresponding to their respective cells $6_1$ to $6_3$ are divided into predetermined regions on the individual scale steps. The terminal device 2 gets map information 31 the user requires while freely moving in the service area composed of the three cells $6_1$ to $6_3$.

In such a cell system, map information 31 showing the regions near boundaries between cells 6 are transmitted from a plurality of base stations 1 provided in the corresponding cells 6. For example, in FIG. 7, the map information 31 about the dotted portion is transmitted from the base stations $1_2$ and $1_3$. Then, while moving over a plurality of cells 6, the terminal device 2 can smoothly acquire the map information 31 about the parts in the vicinities of the boundaries.

Figure 8:
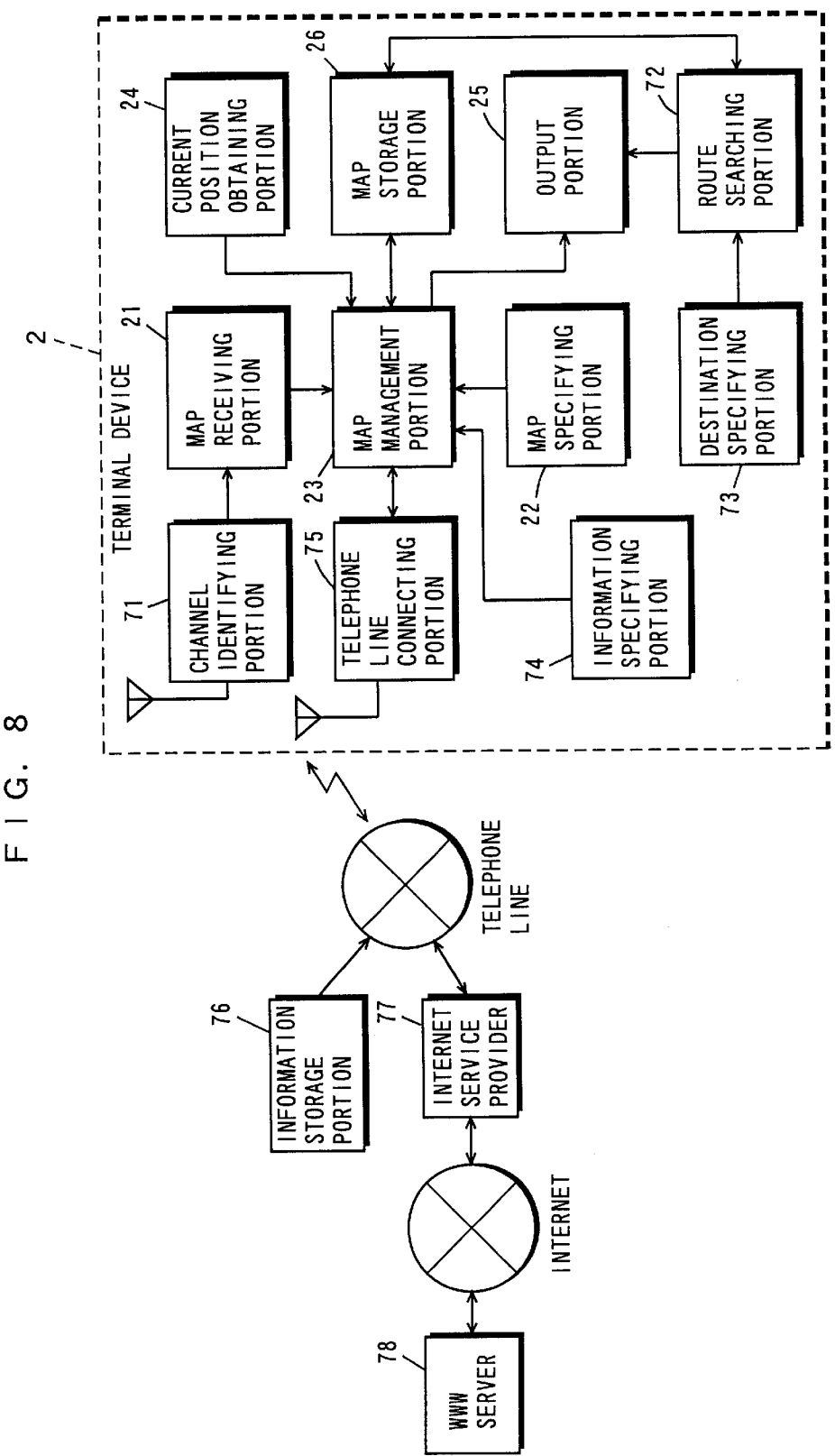
FIG. 8 is a block diagram showing another example of structure of the terminal device 2 shown in FIG. 1
Figure 9:
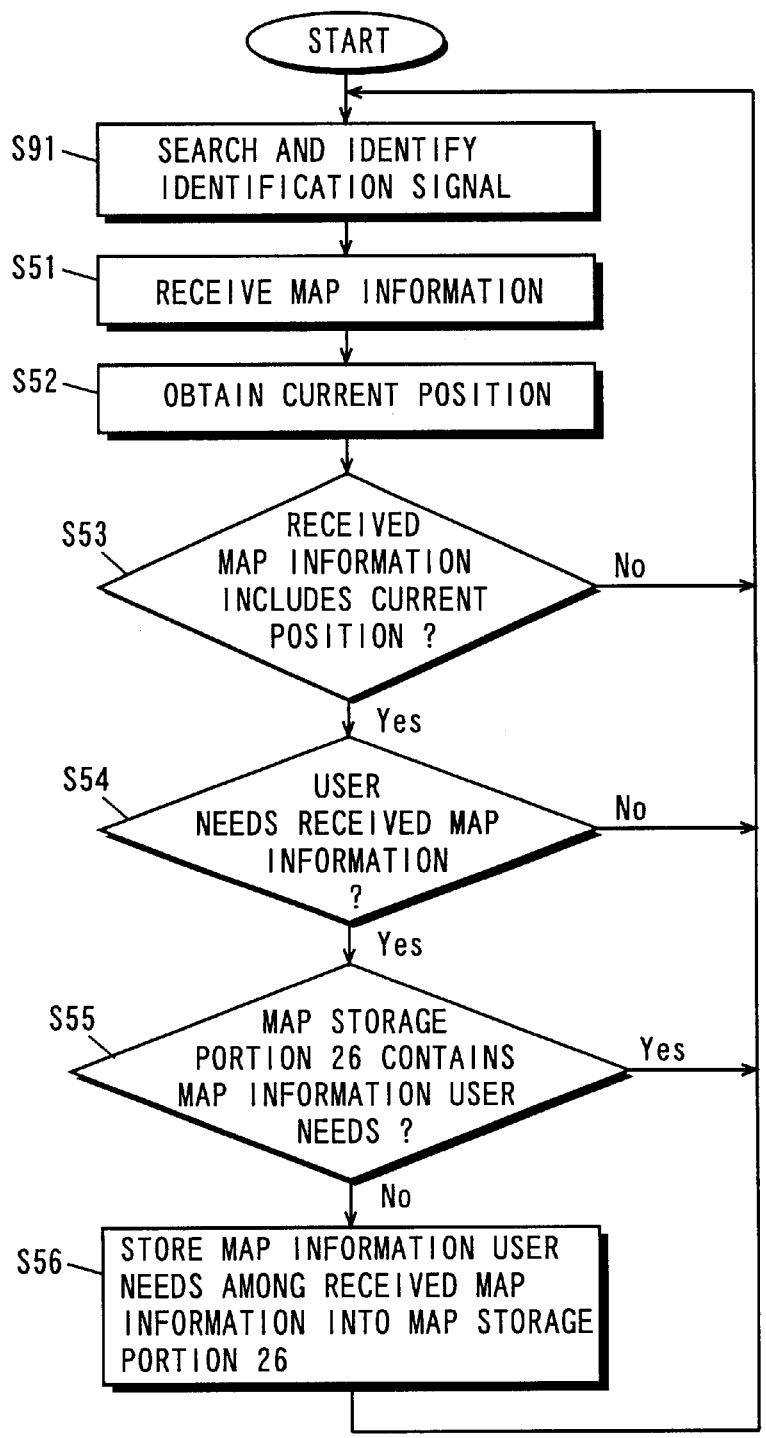
FIG. 9 is a flowchart showing operation of the terminal device 2 shown in FIG. 8.

The base stations 1 also periodically transmit identification signals showing contents of the map information 31 sent in their respective broadcast channels so that the terminal device 2 can identify the respective broadcast channels of the base stations 1. For example, the identification signal is transmitted by using free part in the broadcast channel (i.e., the part in which the map information 31 and the index information are not transmitted). In this case, as shown in FIG. 8, the terminal device 2 contains a channel identifying portion 71 preceding the map receiving portion 21. As shown in the flowchart of FIG. 9, the channel identifying portion 71 searches the identification signals transmitted in a cell 6 to identify a required broadcast channel (i.e., a channel in which the user-required map information 31 is transmitted) (step S91). After the step S91, the processing in and after step S51 described referring to FIG. 5 are executed. In this way, the map terminal 2 automatically searches the broadcast channels to continuously get the map information 31 without requiring operation by the user, which allows smoother acquisition of the map information 31 near boundaries even when the terminal device 2 is moving over a plurality of cells 6.

As shown in FIG. 8, the terminal device 2 may contain a route searching portion 72 for obtaining a rough route to a destination by using rough map information 31 previously stored in the map storage portion 26 and a destination specifying portion 73 having input equipment similar to the map specifying portion 22 and used by the user to set the destination. More specifically, the route searching portion 72 is widely used for the route search function in car navigation systems, which is configured with algorithm based on the Dijkstra method. In this case, the route searching portion 72 searches for an approximate route from a predetermined position (e.g. the current position obtained by the above-described current position obtaining portion 24) to the destination set by the destination specifying portion 73. The map management portion 23 discriminates the map information 31 which is represented on the scale specified by the user and required to display the route found by the route searching portion 72 in the screen of the output portion 25 from among the map information 31 temporarily held in the map receiving portion 21. Then the output portion 25 and the map storage portion 26 display and store the map information 31 discriminated by the map management portion 23.

As described above, the map information 31 may include road network data and/or link cost. The road network data is the data representing connections among roads, and the road link cost is data about times or distances for moving between links or nodes (intersections) The terminal device 2 can know whether the road network data and/or link cost added to the map information 31 has been updated by referring to the version information 36 (see FIG. 3 (b)) included in the index information of the map information 31 required to display the route to the destination, and it can also automatically receive and store the updated map information 31. The route searching portion can also automatically re-execute the route search on the basis of updated road network data and/or link cost. In this way, the newest road network data and/or link cost can be used in the route search for each area and scale specified, which allows the terminal device 2 to appropriately perform the route search in accordance with arbitrary distances.

In some cases, the base station 1 may add area information typically representing restaurants and sight-seeing spots in the service area and/or traffic information in step S41 of FIG. 4 and transmit not only the map information 31 but also the additional area information and/or traffic information through the broadcast channel in step S42. In this case, similarly to the map information 31, the base station 1 transmits area information and/or traffic information containing information, ID, or keyword showing the contents of the area information and/or traffic information in the index information. The terminal device 2 further contains an information specifying portion 74 having input equipment similar to the map specifying portion 22. Then, similarly to the operation with the map information 31, it can selectively receive only area information and/or traffic information that are specified by the information specifying portion 74 on the basis of the information etc. showing the contents of the area information and/or traffic information. The operation of the terminal device 2 can be understood by replacing "map information" in FIG. 5 with "area information and/or traffic information," which is therefore not specifically shown in the form of a diagram, to simplify the drawings. That is to say, the map receiving portion 21 receives the traffic information and/or area information (step S51) and temporarily holds the information. The user of the terminal device 2 enters required traffic information and/or area information by using the input equipment of the information specifying portion 74, and the information specifying portion 74 indicates the input information to the map management portion 23. The map management portion 23 analyzes the information showing the contents of the area information and/or traffic information received, so as to see whether the map receiving portion 21 holds the specified traffic information and/or area information (step S54). When it holds the specified information, it is stored in the map storage portion 26 (step S56). Thus the user can use the newest area information and traffic information. The terminal device 2 can display or speech-output the received area information alone from the output portion 25. When the area information contains positional information about restaurants and sight-seeing spots, it can display the restaurants and sight-seeing spots on the map together with the map information 31. While the terminal device 2 can display the received traffic information alone in the output portion 25 or speech-output it by itself from the output portion 25, it can also display it in the map information 31 (map data for display) or can include it in the road network data for route search to dynamically perform the route search in accordance with the traffic information.

When the area information further contains telephone numbers of restaurants etc. and the terminal device 2 further includes a telephone line connecting portion 75 such as a car telephone as shown in FIG. 8, the telephone line connecting portion 75 can automatically make a call to the telephone number when the user selects the area information. Further, when an information storage portion 76 containing detailed information related to the area information is connected to the telephone line, the telephone line connecting portion 75 can get the detailed information related to the area information stored in the information storage portion 76 through the telephone line. The same operation can be applied also to the traffic information.

When the area information includes URL (Uniform Resource Locator) and a WWW (World Wide Web) server 78 containing detailed information related to the area information is connected to the internet, the telephone line connecting portion 75 can access to the WWW server 78 through the telephone line, internet service provider (SP) 77, and internet as shown in FIG. 8 to obtain the detailed information related to the area information specified by URL. The same operation can be applied also to the traffic information.

Although the map specifying portion 22, destination specifying portion 73, and information specifying portion 74 have been explained as different structures for convenience in the embodiment above, these are usually realized with the same input equipment.

While the invention has been described in detail, the foregoing description is in all aspects illustrative and not restrictive. It is understood that numerous other modifications and variations can be devised without departing from the scope of the invention.

What is claimed is:

1. A method for providing a plurality of kinds of map information from a base station through a broadcast channel to a terminal device, wherein the terminal device is mobile in a service area, said method comprising:

adding, in the base station, index information about areas and scales of individual pieces of the map information respectively to the individual pieces of the map information, and further adding, in the base station, version information of the map information as index information;

transmitting, from the base station through the broadcast channel, the map information accompanied by the index information;

receiving, in the terminal device, the map information transmitted on the broadcast channel;

specifying, in the terminal device, an area and a scale of a required piece of the map information based on an external input; and storing, in the terminal device, the map information that, according to the version information, is the newest map information corresponding to the specified area and scale from among the received map information.

2. The method according to claim 1, further comprising:

specifying, in the terminal device, required traffic information and/or area information based on an external input;

wherein said transmitting further comprises transmitting, from the base station through the broadcast channel, traffic information and/or area information about the service area, said receiving further comprises receiving, in the terminal device, the traffic information and/or the area information transmitted on the broadcast channel, and said storing of the map information further comprises storing, in the terminal device, the specified traffic information and/or area information from among the received traffic information and/or area information.

3. The map information providing method according to claim 1, wherein a plurality of base stations are provided in the service area, the service area being covered by cells defining areas in which the base stations can transmit the map information, and the map information in the vicinity of a boundary between adjacent cells is transmitted from the individual base stations forming the cells.

4. The method according to claim 3, wherein said transmitting includes transmitting, from the plurality of base stations, the map information accompanied by the index information through channels which differ from each other and also transmitting identification signals so that the terminal device can identify the channels respectively assigned to the base stations, and further comprising automatically searching and identifying the channels respectively assigned to the base stations based on the identification signals transmitted from the individual base stations.

5. The method according to claim 1, wherein said transmitting further comprises transmitting, from the base station, newest road network data corresponding to the areas and scales of the map information, thereby allowing the terminal device to execute a route search in accordance with an arbitrary distance.

6. A terminal device constructed to be mobile in a service area, for use with a base station operable to transmit on a broadcast channel a plurality of kinds of map information and index information about areas and scales of individual pieces of the map information, the base station also being operable to periodically transmit version information ofthe map information to be transmitted, and for use in utilizing predetermined map information from among the plurality of kinds of map information to be transmitted on the broadcast channel from the base station, said terminal device comprising:

a map specifying portion operable to specify an area and a scale of required map information based on an external input;

a receiving portion operable to receive the map information transmitted on the channel;

a discriminating portion operable to discriminate the map information that, according to the version information, is the newest map information corresponding to the specified area and scale from among the received map information; and a storage portion operable to store the map information discriminated by said discriminating portion.

7. The terminal device according to claim 6, further comprising a display portion operable to display the map information discriminated by said discriminating portion or the map information stored in said storage portion.

8. The terminal device according to claim 6, further comprising a current position obtaining portion operable to obtain its own current position, wherein said discriminating portion is operable to discriminate map information including the current position obtained by said current position obtaining portion from among the map information received by said receiving portion.

9. The terminal device according to claim 8, further comprising a display portion operable to display the map information discriminated by said discriminating portion or the map information stored in said storage portion and the current position obtained by said current position obtaining portion.

10. The terminal device according to claim 6, further comprising:
- a destination specifying portion operable to specify a destination based on an external input; and
- a route searching portion operable to search for a route to the destination specified by said destination specifying portion by referring to the map information previously stored in said storage portion;
- wherein said discriminating portion is operable to discriminate the map information including the route found by said route searching portion.

11. The terminal device according to claim 10, further comprising a display portion operable to display the map information discriminated by said discriminating portion and including the route found by said route searching portion.

12. The terminal device according to claim 10, further comprising a current position obtaining portion operable to obtain its own current position,
- wherein said route searching portion is operable to search for a route to the destination from the current position obtained by said current position obtaining portion, and
- said discriminating portion is operable to discriminate the map information including the route from the current position to the destination found by said route searching portion.

13. The terminal device according to claim 12, further comprising a display portion operable to display the map information discriminated by said discriminating portion and including the route found by said route searching portion.

14. The terminal device according to claim 6, wherein the base station transmits traffic information and/or area information about the service area, and
- said terminal device further comprises an information specifying portion operable to specify required traffic information and/or area information based on an external input,
- and wherein said receiving portion is operable to receive the traffic information and/or area information transmitted on the channel and said discriminating portion is operable to discriminate the traffic information and/or area information specified by said information specifying portion from among the traffic information and/or area information received by said receiving portion.

15. The terminal device according to claim 14, further comprising a display portion operable to display the traffic information and/or area information discriminated by said discriminating portion alone or together with the map information discriminated by said discriminating portion.

16. The terminal device according to claim 15, wherein the traffic information and/or area information include a telephone number,
- and wherein said terminal device further comprises a telephone line connecting portion operable to make a call to the telephone number included in the traffic information and/or area information displayed on said display portion.

17. The terminal device according to claim 16, for further use with an information storage portion containing detailed information related to the traffic information and/or area information connected to the telephone line,
- wherein said telephone line connecting portion is operable to obtain the detailed information related to the traffic information and/or area information stored in the information storage portion through the telephone line.

18. The terminal device according to claim 16, wherein the traffic information and/or area information include URL (Uniform Resource Locator), and said terminal device is further for use with a WWW (World Wide Web) server containing detailed information related to the traffic information and/or area information connected to the telephone line through internet,
- wherein said telephone line connecting portion is operable to connect to the WWW server through the telephone line and the internet to obtain the detailed information related to the traffic information and/or area information specified by the URL.

19. The terminal device according to claim 6, wherein the map information includes road network data, and
- said discriminating portion is operable to discriminate the newest road network data based on the version information.

20. The terminal device according to claim 19, further comprising:
- a destination specifying portion operable to specify a destination based on an external input; and
- a route searching portion operable to search for a route to the destination specified by said destination specifying portion by referring to the road network data previously stored in said storage portion,
- wherein said route searching portion is operable to search for the route to the destination based on the newest road network data when said discriminating portion discriminates the newest road network data.

21. The terminal device according to claim 6, wherein the map information includes link cost, and
- said discriminating portion is operable to discriminate the newest link cost based on the version information.

22. The terminal device according to claim 21, further comprising:
- a destination specifying portion operable to specify a destination based on an external input; and
- a route searching portion operable to search for a route to the destination specified by said destination specifying portion by referring to the link cost previously stored in said storage portion;
- wherein said route searching portion is operable to search for the route to the destination based on the newest link cost when said discriminating portion discriminates the newest link cost.

23. The terminal device according to claim 6, for use with a plurality of base stations, wherein the service area in which the map information can be provided is covered by a plurality of cells defining areas in which the individual base stations can transmit the map information, and the individual base stations transmit the map information and the index information by using different channels and also transmit identification signals for identification of the channels,
- said terminal device further comprising a channel identifying portion operable to automatically search and identify the channels used by the base stations based on the received identification signals.

24. A map information system comprising:
- a base station operable to transmit on a broadcast channel a plurality of kinds of map information and index information about areas and scales of individual pieces of the map information, said base station also being operable to periodically transmit version information of the map information to be transmitted; and a terminal device constructed to be mobile in a service area, said terminal device comprising:
   a map specifying portion operable to specify an area and a scale of required map information based on an external input;
   a receiving portion operable to receive the map information transmitted on the channel;
   a discriminating portion operable to discriminate the map information that, according to the version information, is the newest map information corresponding to the specified area and scale from among the received map information; and
   a storage portion operable to store the map information discriminated by said discriminating portion.

25. The map information system according to claim 24, wherein said terminal device further comprises:
   a display portion operable to display the map information discriminated by said discriminating portion or the map information stored in said storage portion.

26. The map information system according to claim 24, wherein said terminal device further comprises:
   a current position obtaining portion operable to obtain its own current position,
   wherein said discriminating portion is operable to discriminate map information including the current position obtained by said current position obtaining portion from among the map information received by said receiving portion.

27. The map information system according to claim 26, wherein said terminal device further comprises:
   a display portion operable to display the map information discriminated by said discriminating portion or the map information stored in said storage portion and the current position obtained by said current position obtaining portion.

28. The map information system according to claim 24, wherein said terminal device further comprises:
   a destination specifying portion operable to specify a destination based on an external input, and
   a route searching portion operable to search for a route to the destination specified by said destination specifying portion by referring to the map information previously stored in said storage portion,
   wherein said discriminating portion is operable to discriminate the map information including the route found by said route searching portion.

29. The map information system according to claim 29, wherein said terminal device further comprises a display portion operable to display the map information discriminated by said discriminating portion and including the route found by said route searching portion.

30. The map information system according to claim 29, wherein said terminal device further comprises a current position obtaining portion operable to obtain its own current position,
   wherein said route searching portion is operable to search for a route to the destination from the current position obtained by said current position obtaining portion, and
   said discriminating portion is operable to discriminate the map information including the route from the current position to the destination found by said route searching portion.

31. The map information system according to claim 30, wherein said terminal device further comprises a display portion operable to display the map information discriminated by said discriminating portion and including the route found by said route searching portion.

32. The map information system according to claim 24, wherein:
   said base station is further operable to transmit traffic information and/or area information about the service area;
   said terminal device further comprises an information specifying portion operable to specify required traffic information and/or area information based on an external input; and
   said receiving portion is operable to receive the traffic information and/or area information transmitted on the channel and said discriminating portion is operable to discriminate the traffic information and/or area information specified by said information specifying portion from among the traffic information and/or area information received by said receiving portion.

33. The map information system according to claim 32, wherein said terminal device further comprises a display portion operable to display the traffic information and/or area information discriminated by said discriminating portion alone or together with the map information discriminated by said discriminating portion.

34. The map information system according to claim 33, wherein the traffic information and/or area information include a telephone number, and
   said terminal device further comprises a telephone line connecting portion operable to make a call to the telephone number included in the traffic information and/or area information displayed on said display portion.

35. The map information system according to claim 34, further comprising:
   an information storage portion containing detailed information related to the traffic information and/or area information connected to a telephone line,
      wherein said telephone line connecting portion is operable to obtain the detailed information related to the traffic information and/or area information stored in said information storage portion through the telephone line.

36. The map information system according to claim 34, wherein the traffic information and/or area information include URL (Uniform Resource Locator), said map information system further comprising:
   a WWW (World Wide Web) server containing detailed information related to the traffic information and/or area information connected to the telephone line through internet,
      wherein said telephone line connecting portion is operable to connect the WWW server through the telephone line and the internet to obtain the detailed information related to the traffic information and/or area information specified by the URL.

37. The map information system according to claim 24, wherein the map information includes road network data, and
   said discriminating portion is operable to discriminate the newest road network data based on the version information.

38. The map information system according to claim 37, wherein said terminal device further comprises:

a destination specifying portion operable to specify a destination based on an external input; and a route searching portion operable to search for a route to the destination specified by said destination specifying portion by referring to the road network data previously stored in said storage portion, wherein said route searching portion is operable to search for the route to the destination based on the newest road network data when said discriminating portion discriminates the newest road network data.

39. The map information system according to claim 24, wherein the map information includes link cost, and said discriminating portion is operable to discriminate the newest link cost based on the version information.

40. The map information system according to claim 39, wherein said terminal device further comprises:

a destination specifying portion operable to specify a destination based on an external input; and a route searching portion operable to search for a route to the destination specified by said destination specifying portion by referring to the link cost previously stored in said storage portion;

wherein said route searching portion is operable to search for the route to the destination based on the newest link information when said discriminating portion discriminates the newest link cost.

41. The map information system according to claim 24, comprising:

a plurality of said base station, wherein the service area in which the map information can be provided is covered by a plurality of cells respectively defining areas in which said base stations can transmit the map information, said plurality of base stations being operable to transmit the map information and the index information by using different channels and also to transmit identification signals for identification of the channels;

wherein said terminal device further comprises a channel identifying portion operable to automatically search and identify the channels used by the base stations based on the received identification signals.

* * * * *